(12) United States Patent
Maruyama

(10) Patent No.: US 6,250,524 B1
(45) Date of Patent: Jun. 26, 2001

(54) SPARE-TIRE FASTENING STRUCTURE

(75) Inventor: T. Maruyama, Toyohashi (JP)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/664,692

(22) Filed: Sep. 19, 2000

(30) Foreign Application Priority Data

Sep. 29, 1999 (JP) ................................. 11-275754

(51) Int. Cl.$^7$ .................................................. B62D 43/00
(52) U.S. Cl. ................................. 224/42.24; 224/42.13; 224/42.14; 296/37.2; 411/267; 411/270; 411/433
(58) Field of Search .............................. 224/42.12, 42.13, 224/42.14, 42.2, 42.23, 42.24; 296/37.2, 37.3; 248/205.1; 411/265, 267, 270, 433, 437, 908

(56) References Cited

U.S. PATENT DOCUMENTS

| | | | | |
|---|---|---|---|---|
| 5,080,269 | * | 1/1992 | Larsson et al. | 224/42.24 |
| 5,586,698 | | 12/1996 | Satoh . | |
| 5,845,825 | * | 12/1998 | Utsuno et al. | 224/42.24 |
| 5,902,085 | | 5/1999 | Yuta . | |
| 5,906,464 | * | 5/1999 | Wedenig | 411/433 |
| 5,944,467 | * | 8/1999 | Yuta | 411/433 |
| 6,007,284 | * | 12/1999 | Taneichi | 411/267 |

FOREIGN PATENT DOCUMENTS

| | | |
|---|---|---|
| 60-70480 | 5/1985 | (JP) . |
| 61-190782 | 11/1986 | (JP) . |
| 5-22279 | 3/1993 | (JP) . |

* cited by examiner

Primary Examiner—Stephen K. Cronin
(74) Attorney, Agent, or Firm—Edward D. Murphy

(57) ABSTRACT

A spare-tire fastening structure is for fastening a spare-tire 1 to a support member (bracket 2) in a spare-tire receiving section. The fastening structure comprises a nut member 5 and a bolt member 9. The nut member 5 comprises a plastic housing 10 including a flange 13 and a hollow stem 14 extending from the flange 13; and a plastic nut body 11 including two screw segments 23 forming one screw as a whole, and spring portions 22 each extending from each of the screw segments 23 to a base portion 21 to bias or push each of the screw segments 23 up from the base portion 21; wherein an outer surface of the housing stem 14 is formed with engagement pawls 17 which are associated with the flange 13 to sandwich or grip the support member between the pawls 17 and the flange 13; and the nut member 5 is mounted on the support member by inserting the housing stem 14 from an end thereof opposite to the flange 13 into a mounting hole of the support member and pressing the housing stem 14 thereinto until the flange 13 is brought into surface-contact with the support member; wherein, under a condition where a mounting hole of a spare-tire wheel is aligned with the nut member 5, the bolt member 9 is pressed through the spare-tire wheel 6 into the nut member 5 in the same direction as of a pressing operation for mounting the nut member 5, so that the bolt member 9 is engaged with the nut member 5 so as to fasten the spare-tire to the support member.

5 Claims, 13 Drawing Sheets

SPARE-TIRE FASTENING STRUCTURE

BACKGROUND OF THE INVENTION

1. Field of Invention

The present invention relates to a spare-tire fastening structure for fastening a spare-tire to a support member in a spare-tire receiving section by engaging a bolt member with a nut member anchored to the support member such as a bracket.

2. Description of Prior Art

Generally, when a spare-tire is to be fastened to a support member such as a bracket in a spare-tire receiving section of an automobile, a mounting hole of a wheel of the spare-tire is aligned with a nut welded to the support member, and then a bolt member is inserted through the mounting hole and is screwed into the nut. This operation takes long time for screwing the bolt member and accordingly, makes poor working efficiency. In order to solve this problem, Japanese Utility Model Registration No. 2583778 (Japanese Utility Model Publication No. 05-022279) discloses a improved fastening structure in which a plastic nut member is fixed to a boss in a spare-tire receiving section and a bolt member is inserted into the nut member to fasten the spare-tire thereto. Since this fastening structure allows the spare-tire to be fastened only by press-inserting the bolt member into the nut member, a screwing operation of the bolt member can be eliminated or reduced greatly to improve the working efficiency.

The fastening structure disclosed in the above Utility Model publication, however, is configured to attach the nut member to the boss as the support member in the spare-tire receiving section from an under surface side of the boss, and this makes an attaching operation troublesome since it is required to stretch one hand to a back side of the boss. Further, since the nut member is attached to the boss from the under surface side thereof, an inserting force of the bolt member into the nut member is applied to the nut member in a direction to disengage it from the boss, and therefore this structure is not preferable since there is a fear that the nut member might be disengaged from the boss by a strong inserting force applied thereto by the bolt member. Spare-tire fastening structures other than that of the above Utility Model publication are disclosed in Japanese Utility Model Publication Nos. 60-070480 and 61-190782.

The spare-tire fastening structure disclosed in the Utility Model Publication No. 60-70480 has a bar disposed in the spare-tire receiving section with a base portion thereof being fixed to a certain portion therein, and the spare-tire is placed with the bar being inserted into the mounting hole of the spare-tire wheel, and then a special fitting is attached to a top end of the bar projected through the mounting hole of the wheel to fasten the spare-tire. This fastening structure does not use a nut member and a bolt member for fastening but requires welding the bar to the spare-tire receiving section and also requires the special fitting. In the spare-tire fastening structure disclosed in the Utility Model Publication No. 61-190782, a housing member made of metal is fixed to a certain portion of the spare-tire receiving section by, for example, welding, and a pair of half nut blocks made of metal, which cooperate to function as a complete nut, and a metal spring for biasing the pair of half nut blocks upward are disposed within the housing member to make up a nut member as a whole, so that the spare-tire may be fastened by placing the spare-tire with the mounting hole of the spare-tire wheel being aligned with the nut member and then by inserting the bolt member into the nut member. This fastening structure requires a welding operating for fixing the housing of the nut member to the spare-tire receiving section and an assembling operation for attaching the metal half nut blocks and the metal spring to the housing to be held therein after the housing has been fixed to the spare-tire receiving section, and further, the metal members may cause a rusting problem.

U.S. Pat. No. 5,586,698 discloses a structure in which a service tool such as a wheel wrench may be held by a holder in the spare-tire receiving section. It is convenient that the spare-tire receiving section is provided with the tool holding portion, but in this publication, nothing is referred to the spare-tire fastening structure for fastening the spare-tire to its receiving section by the bolt member and the nut member. U.S. Pat. No. 5,902,085 discloses a push-in type nut made of plastics comprising a plastic cap composed of a small flange and a hollow cylinder extending from the flange, and a plastic nut body composed of a pair of screw segments each having an internal thread formed inner surface thereof so as to cooperate with other screw segment to make up a complete nut as a whole and a pair of springs each extending from each screw segment to a base portion for biasing each screw segment upward from the base. This publication discloses the push-in type nut which is used in place of a conventional nut, but does not suggest anything about an application of the press-in type nut to the fastening structure for fastening the spare-tire to the spare tire receiving section.

SUMMARY OF THE PRESENT INVENTION

Accordingly, an object of the present invention is to provide a spare-tire fastening structure which maintains an advantage that the spare-tire can be easily be fastened by inserting a bolt member into a nut member and further provides additional advantages that the nut member can also easily be mounted on the spare-tire receiving section and the nut member cannot be disengaged from the spare-tire receiving section when the bolt member is inserted into the nut member. Another object of the present invention is to provide a spare-tire fastening structure which is composed of the nut member and the bolt member and allows a service tool such as a screwdriver to be held thereby.

The object of the present invention described above can be achieved by a spare-tire fastening structure for fastening a spare-tire to a support member in a spare-tire receiving section by engaging a bolt member with a nut member anchored to the support member. The fastening structure is characterized in that the nut member comprises a plastic housing including a flange and a hollow stem extending from the flange; and a plastic nut body including at least two screw segments with each having an internal thread formed on an inner surface thereof, so as to form one screw as a whole, and spring portions each extending from each of the screw segments to a base portion to bias or push each of the screw segments up from the base portion; wherein an outer surface of the housing stem of the nut member is formed with engagement pawls which are associated with the flange to sandwich or grip the support member between the pawls and the flange; and the nut member is mounted on the support member by inserting the housing stem from an end thereof opposite to the flange into a mounting hole of the support member and pressing the housing stem thereinto until the flange is brought into surface-contact with the support member; wherein, under a condition where a mounting hole of a spare-tire wheel is aligned with the nut member, the bolt member is pressed through the spare-tire wheel into the nut member in the same direction as of a pressing operation for mounting the nut member, so that the bolt member is engaged with the nut member to fasten the spare-tire to the support member.

As described above, since the nut member is mounted on the support member by inserting the housing stem from its end opposite to the flange into the mounting hole of the support member and pressing the housing stem thereinto until the flange is brought into surface-contact with the support member, the nut member can be mounted on the support member in the spare-tire receiving section only by a simple pressing operation, and on the other hand, the bolt member can be engaged with the nut member only by pressing the bolt member into the nut member in the same direction as of the pressing operation for mounting the nut member, that is, both of the nut member and the bolt member can be handled from the same side or one side, and in addition, since the flange of the nut member is brought into surface-contact with the upper surface of the support member in the spare-tire receiving section so as to work as a stopper, the nut member is never disengaged from the support member when the bolt member is inserted into the nut member so as to press the nut member downward. Since the bolt member is engaged with the nut member by pressing the bolt member into the nut member, the spare-tire can be easily fastened to the spare-tire receiving section.

In the spare-tire fastening structure described above, it is preferable that the housing stem is formed to have a non-circular cross-section fitting to the non-circular mounting hole (for example, rectangular or ellipse) of the support member so that the housing does not rotate with respect to the support member after having been mounted thereon. Further, it is preferable that the bolt member is made of integrated plastic molding having an elongated shaft section with an external thread formed thereon and a head section of large diameter formed on an end of the shaft section. At that time, it is preferable that the head section is provided with a knob formed on an upper surface thereof for handling it by finger. Further, in the above spare-tire fastening structure, it is also preferable that the bolt member has a tool holder formed on the head section thereof.

According to the spare-tire fastening structure of the present invention, since the nut member is mounted on the support member by inserting the housing stem from its end opposite to the flange into the mounting hole of the support member and pressing the housing stem thereinto until the flange is brought into surface-contact with the support member, the nut member can be mounted on the support member in the spare-tire receiving section only by a simple pressing operation, and on the other hand, the bolt member can be engaged with the nut member only by pressing the bolt member into the nut member in the same direction as of the pressing operation for mounting the nut member, that is, both of the nut member and the bolt member can be handled from the same side or one side, and in addition, since the flange of the nut member is brought into surface-contact with the upper surface of the support member in the spare-tire receiving section so as to work as a stopper, the nut member is never disengaged from the support member when the bolt member is inserted into the nut member so as to press the nut member downward. Since the bolt member is engaged with the nut member by pressing the bolt member into the nut member, the spare-tire can be easily fastened to the spare-tire receiving section.

BRIEF DESCRIPTION OF THE ACCOMPANYING DRAWINGS

DETAILED DESCRIPTION INCLUDING A PREFERRED EMBODIMENT

Figure 16:
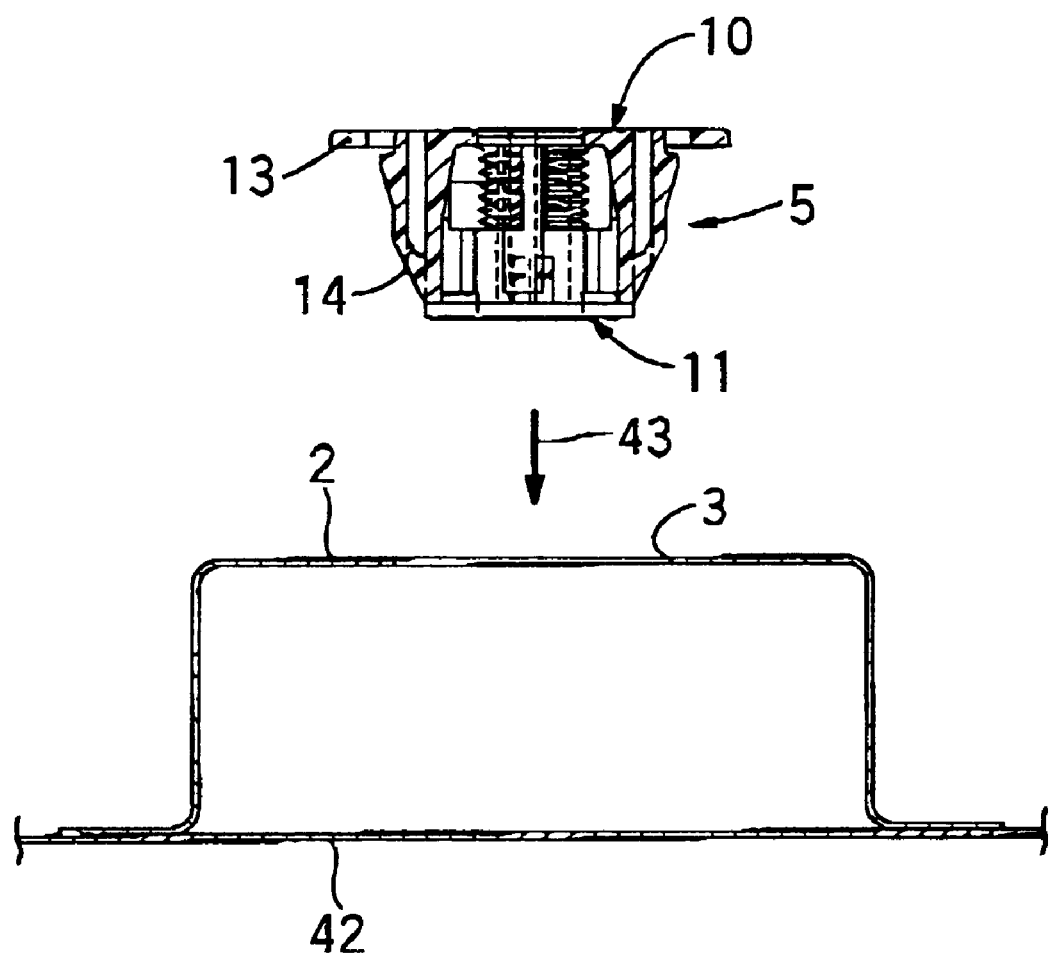
FIG. 16 shows a relation of the nut member and the bracket prior to assembling thereof.
Figure 17:
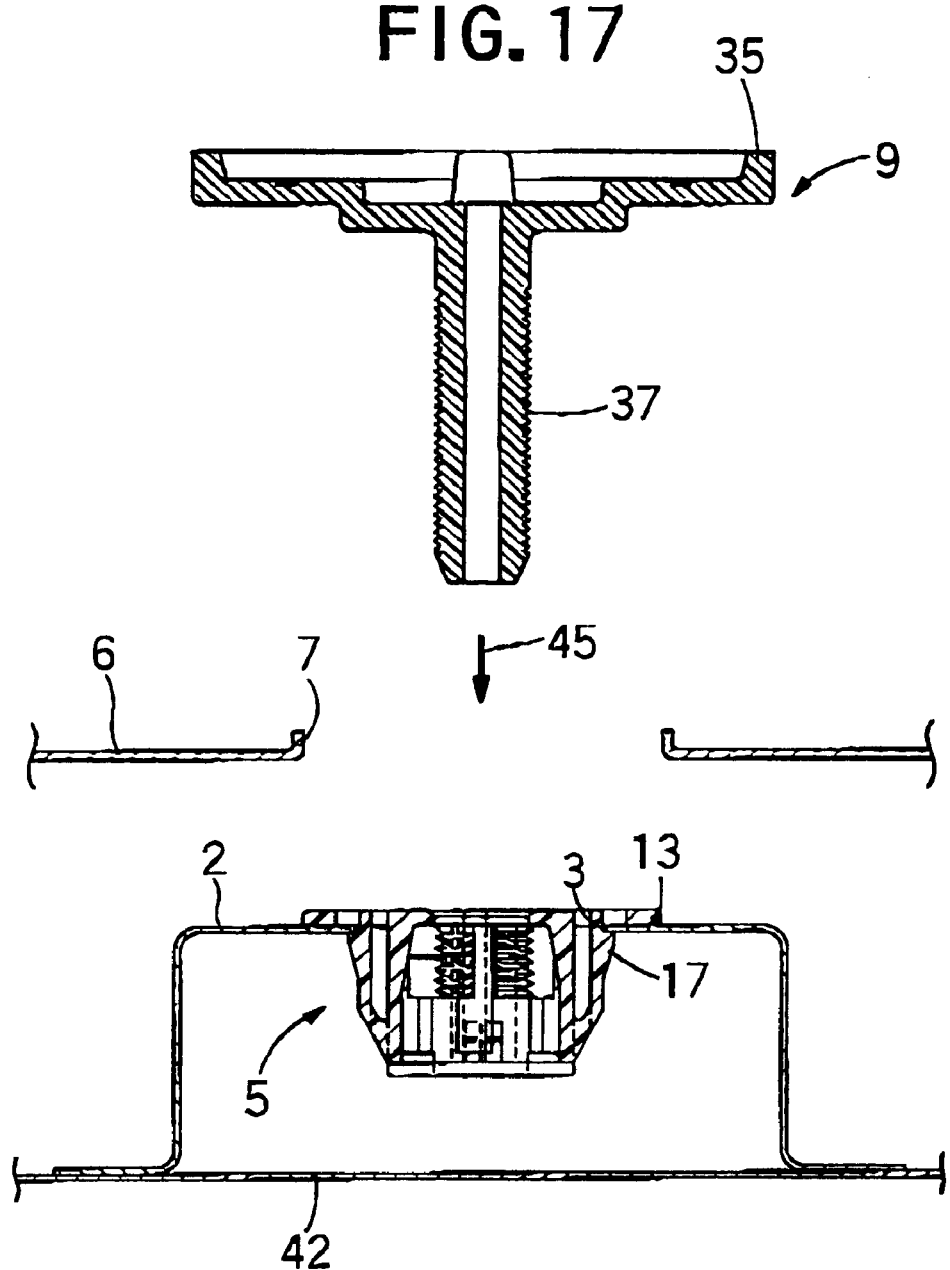
FIG. 17 shows a relation of the nut member mounted on the bracket, the spare-tire and the bolt member before the spare-tire is fastened by the spare-tire fastening structure of the present invention.
Figure 18:
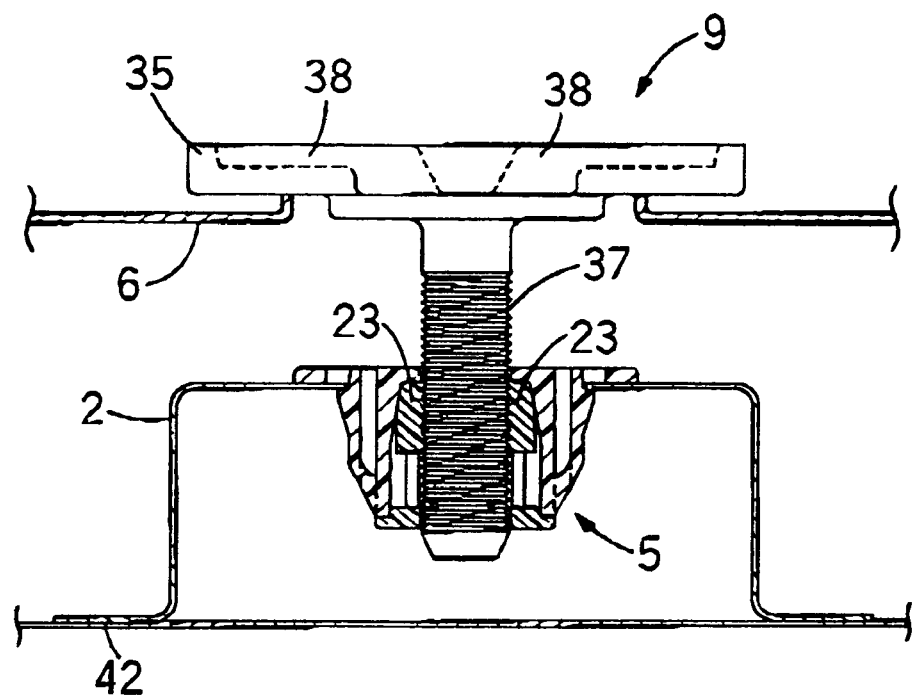
FIG. 18 shows a relation of the nut member mounted on the bracket, the spare-tire and the bolt member after the spare-tire has been fastened by the spare-tire fastening structure of the present invention.
Figure 19:
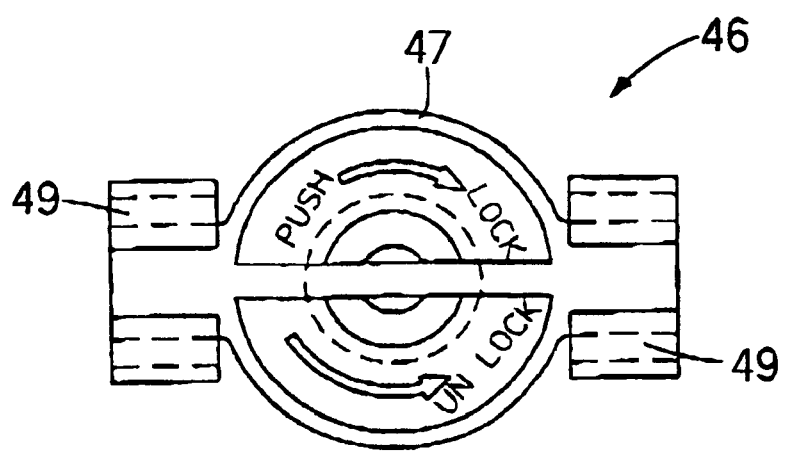
FIG. 19 is a plan view of an alternative embodiment of the bolt member.
Figure 20:
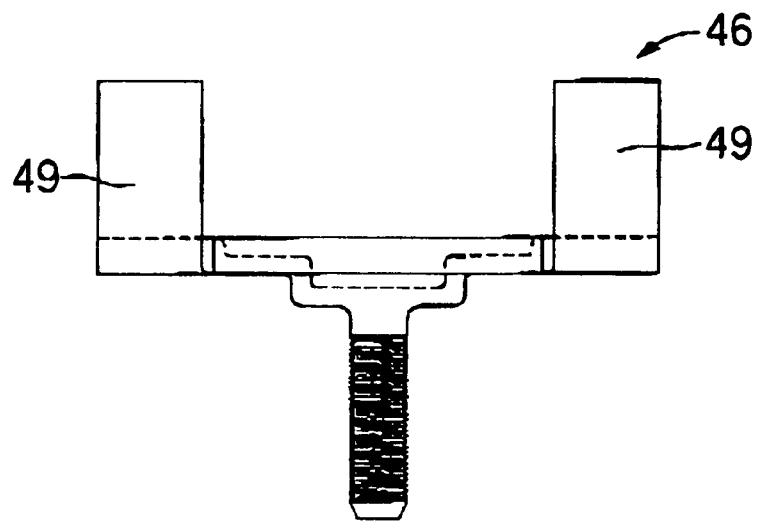
FIG. 20 is a front view of the bolt member of FIG. 19.

Embodiments of the present invention will be described in detail with reference to the drawings attached herewith. FIGS. 1 to 15 show a configuration of the spare-tire fastening structure according to an embodiment of the present invention, and FIGS. 16 to 18 show an operation or process to fasten a spare-tire to a spare-tire receiving section using the spare-tire fastening structure of the present invention. Further, FIGS. 19 to 22 show an alternative embodiment of the bolt member.

Figure 1:
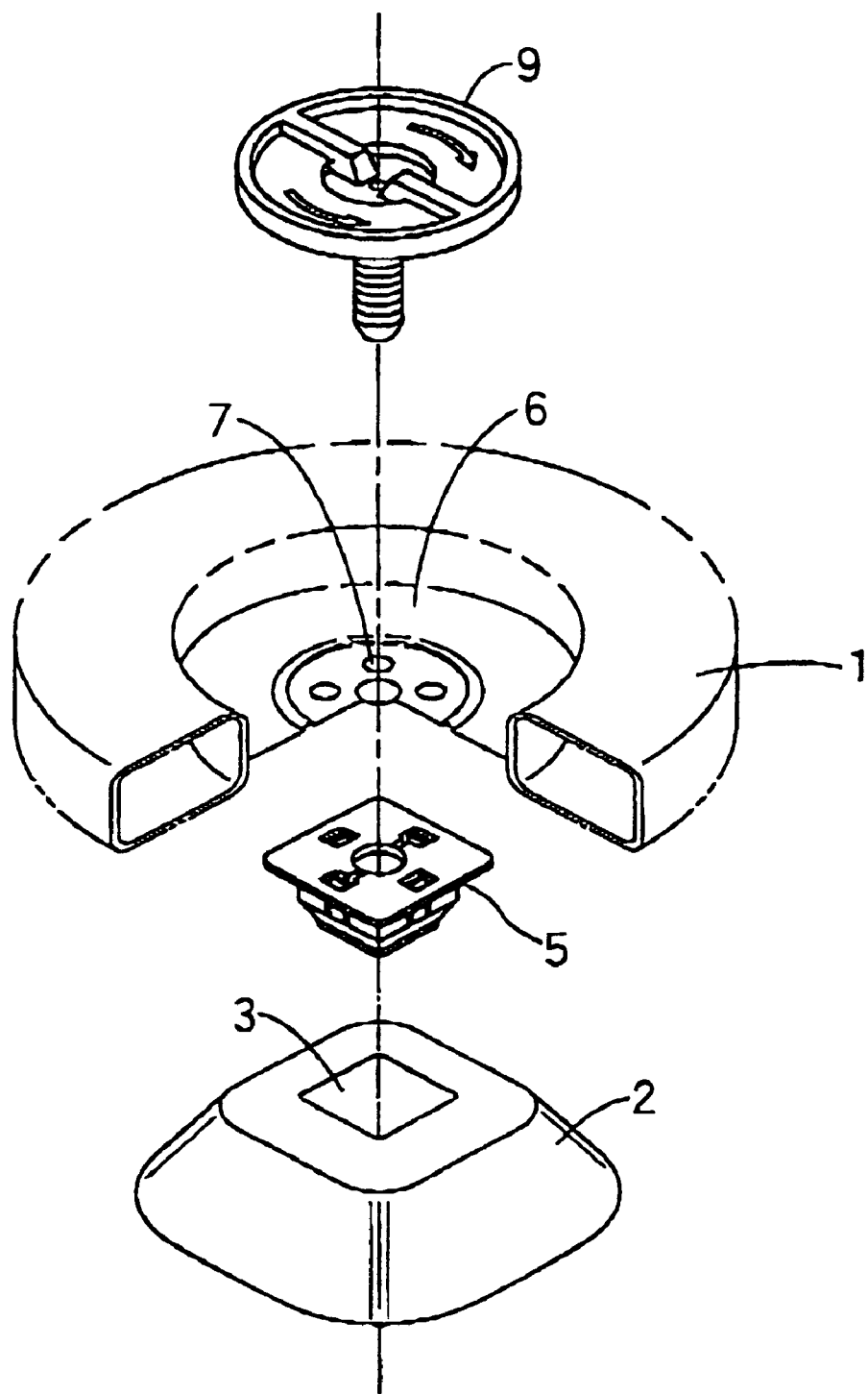
FIG. 1 is a perspective view of a spare-tire fastening structure according to the present invention, illustrating a relation of a bracket (support member) in a spare-tire receiving section, a nut member, a spare-tire and a bolt member prior to assembling thereof.
Figure 2:
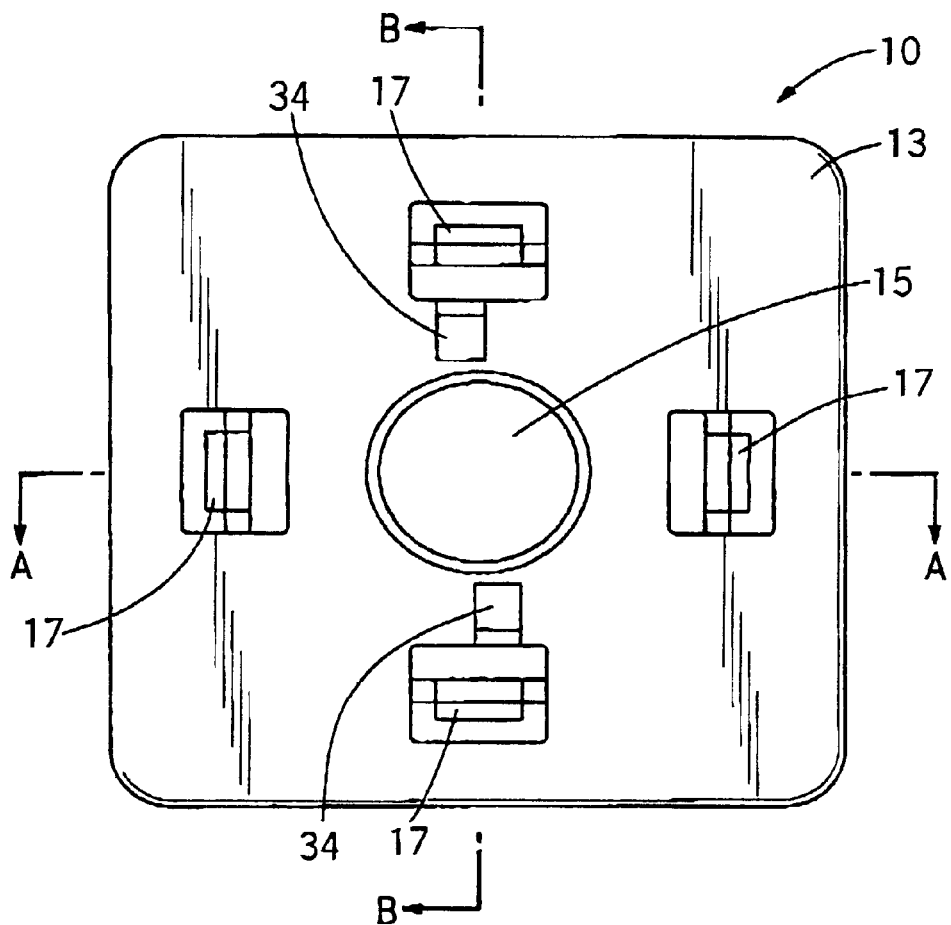
FIG. 2 is a plan view of a housing of the nut member, which is one of the main elements of the spare-tire fastening structure of the present invention.
Figure 3:
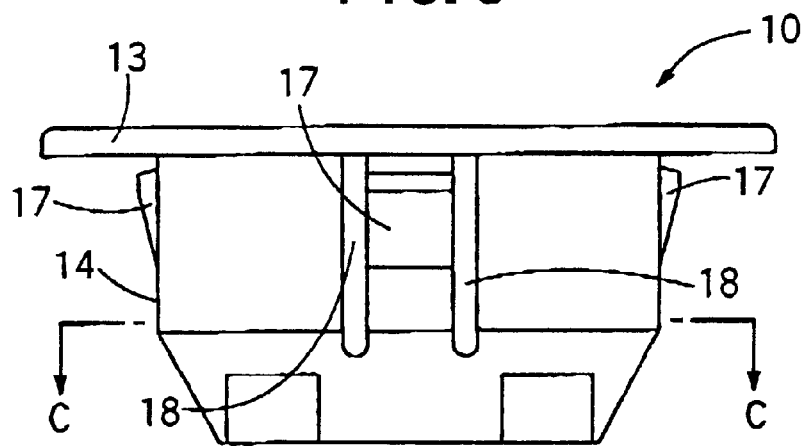
FIG. 3 is a front view of the housing of FIG. 2.
Figure 4:
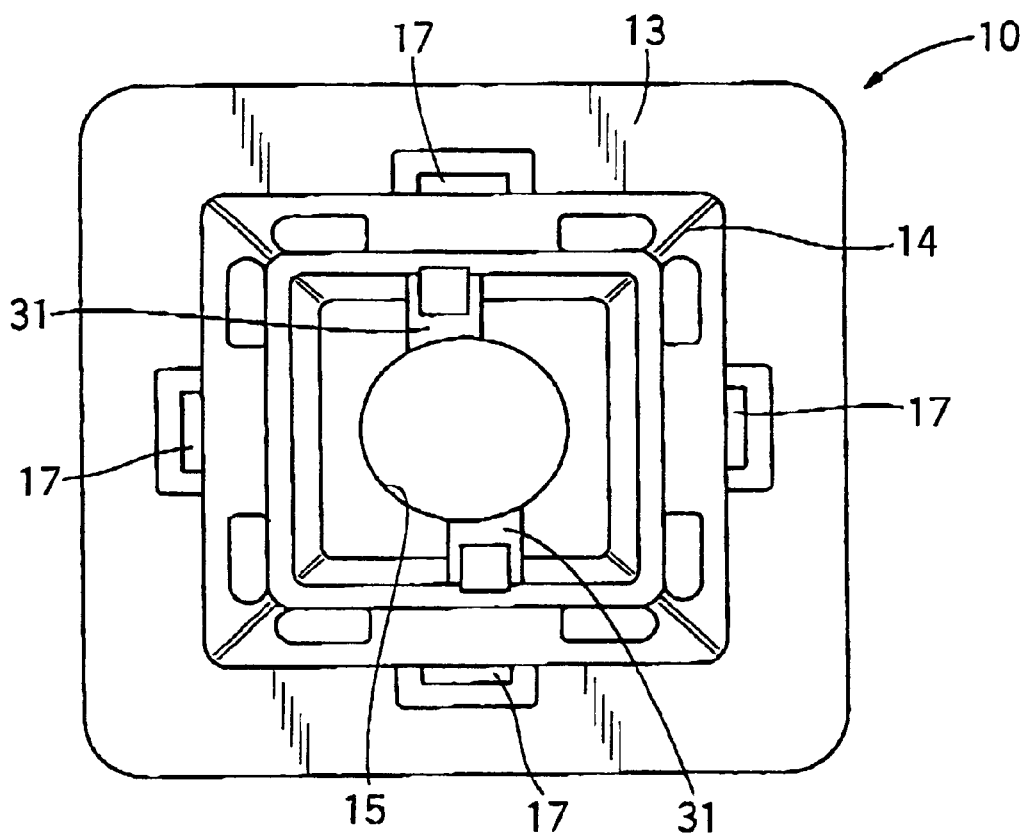
FIG. 4 is a bottom view of the housing of FIG. 2.
Figure 5:
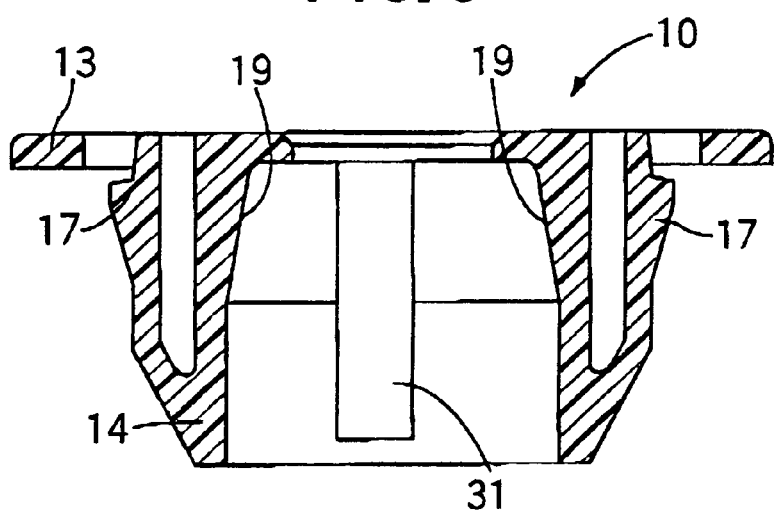
FIG. 5 is a cross sectional view of the housing taken on line A—A of FIG. 2.
Figure 6:
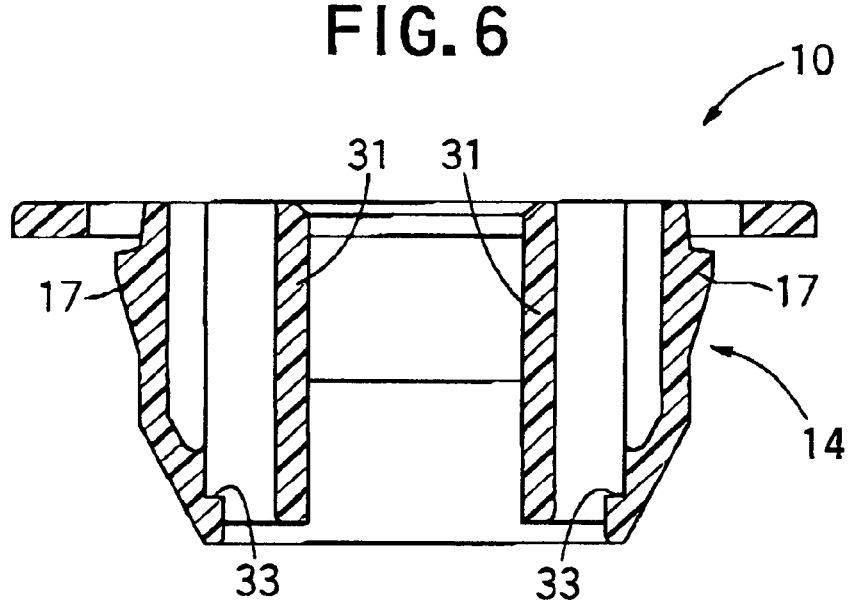
FIG. 6 is a cross sectional view of the housing taken on line B—B of FIG. 2.
Figure 7:
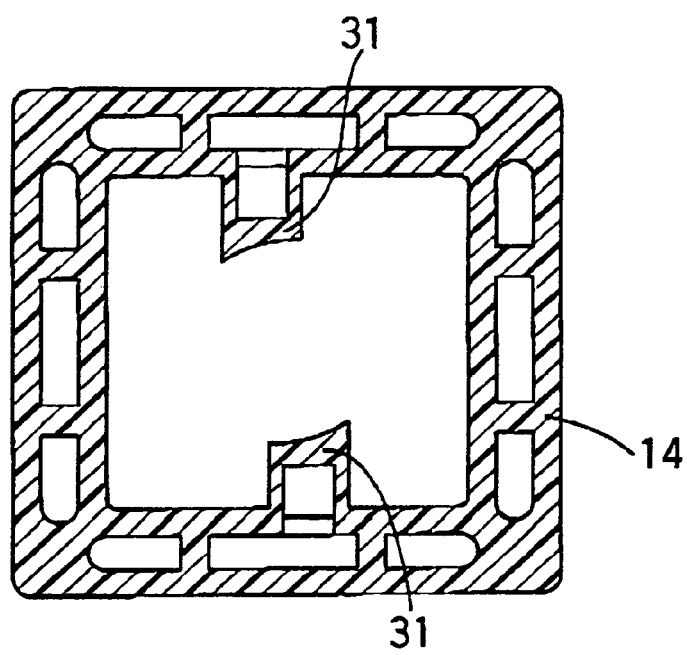
FIG. 7 is a cross sectional view of the housing taken on line C—C of FIG. 3.

Referring to FIG. 1, a spare-tire 1, which is shown by a partially cutaway view for the convenience of illustration, is fastened to a support member or a bracket 2 provided in a spare-tire receiving section of an automobile, by the spare-tire fastening structure according to the present invention.

The spare-tire fastening structure is composed of a nut member 5 which is inserted into and fixed to a rectangular fixing hole 3 formed on the support member or the bracket 2, and a bolt member 9 which is to be engaged with the nut member 5 by being press-inserted into the nut member 5 through a mounting hole 7 of a wheel 6 of the spare-tire 1 placed so as to be aligned with the nut member 5. In the present embodiment, both of the nut member 5 and the bolt member 9 are made of plastics. Then the nut member 5 will be described in detail with reference to FIGS. 2 to 11, while the bolt member will be described in detail with reference to FIGS. 12 to 15.

Figure 8:
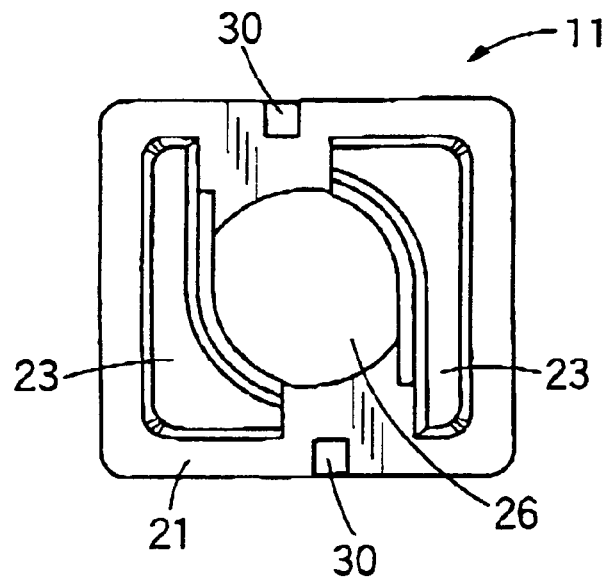
FIG. 8 is a plan view of a nut body of the nut member, which is one of the main elements of the spare-tire fastening structure of the present invention.
Figure 9:
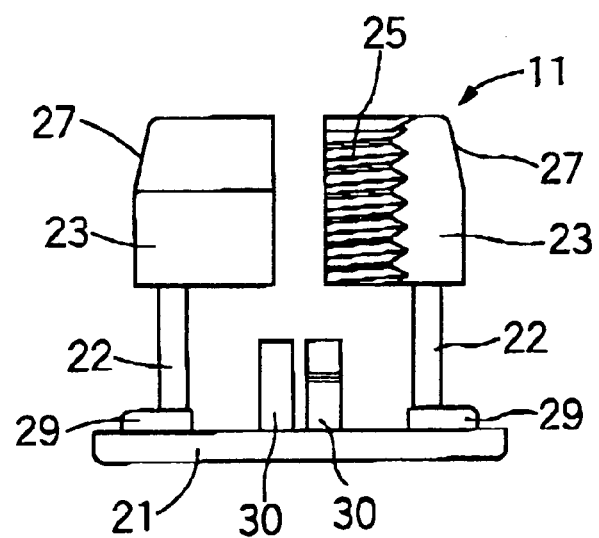
FIG. 9 is a front view of the nut body of FIG. 8.
Figure 10:
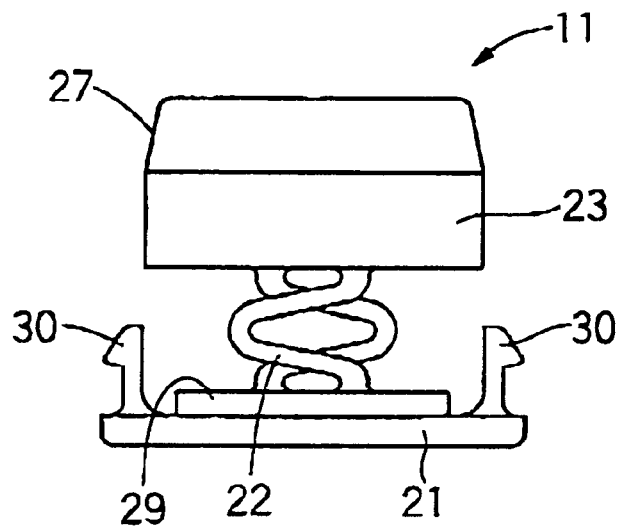
FIG. 10 is a side view of the nut body of FIG. 8.
Figure 11:
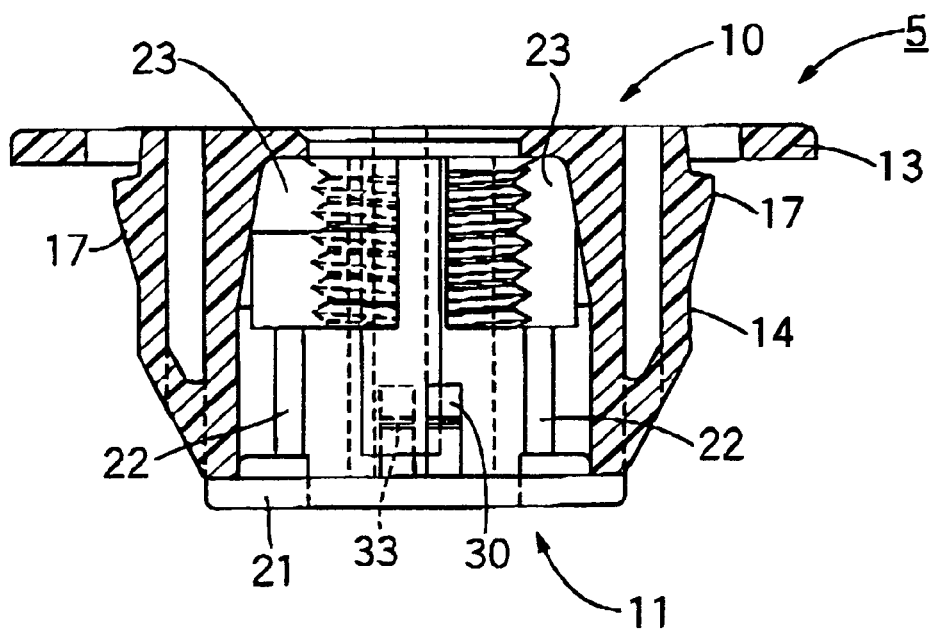
FIG. 11 is a cross sectional view of the nut member made up by incorporating the nut body of FIG. 8 into the housing of FIG. 2.

The nut member 5 comprises a plastic housing 10 shown in FIGS. 2 to 7 and a plastic nut body 11 shown in FIGS. 8 to 10, and as shown in FIG. 11, the nut 11 is incorporated into and is engaged with the housing 10 to form the nut member 5.

The housing 10 will be described in detail with reference to FIGS. 2 to 7. The housing 10 comprises an upper rectangular flange 13 and a hollow stem 14 extending downward from the flange 13. An under surface of the flange 13 is to be brought into contact with an upper surface of the bracket 2. A bolt insert hole 15 is provided on a central portion of the flange 13, through which a shaft section of the bolt member 9 is inserted. The stem 14 is formed into a rectangular hollow cylinder with a rectangular cross-section so as to fit to a shape of the mounting hole 3 of the bracket 2. The cross section of the stem 14 is formed into a certain shape fitting to the non-circular mounting hole 3 of the bracket 2 (though being illustrated as rectangular in the drawing, it may be an arbitrary polygon such as hexagon or may be non-circular shape such as ellipse), so that the stem 14 cannot rotate with respect to the bracket 2 when being engaged therewith. Engagement pawls 17 are formed on an outer surface of the stem 14 near to the flange 13 so as to cooperate with the flange 13 to sandwich and grip the bracket 2 therebetween. In this embodiment, the engagement pawl 17 is formed on each of four walls of the rectangular stem 14. On each side of each engagement pawl 14, a slit 18 is formed extending toward the flange 13 to make a top end of the engagement pawl 14 near to the flange 13 flexible and thereby to reduce a resistance thereof which may be generated when the housing stem 14 is inserted into the mounting hole 3 of the bracket 2. In addition, a lower portion of the stem 14 is tapered to facilitate an insertion of the stem 14 into the mounting hole 3 of the bracket 2.

An inside of the stem 14 is formed into hollow to receive and hold the nut body 11, and a lower end of the stem 14 is made open to outside. An inner wall of the stem 14 within a range near to the flange 13 is formed into a tapered surface 19 (see FIG. 5) toward the bolt insert hole 15 so that an inner diameter of the stem 14 decreases gradually toward the flange 13. The tapered surface 19 is formed to match tapered surfaces of two screw segments of the nut body 11. The inner diameter of the stem 14 below the tapered surface 19 is formed into a size which makes the bolt insert hole of the nut body 11 be slightly larger than an outer diameter of the bolt when outer surfaces of the two screw segments of the nut body 11 are brought into contact with the inner wall of the stem 14.

Then the nut body 11 will be described in detail with reference to FIGS. 8 to 11. The nut body 11 is composed of a base portion 21 located in a lowest position and formed into rectangular so as to match a hollow section of the stem 14 of the housing 10, two spring portions 22 each extending upward from the base portion 21 and being formed by a strip having a configuration of a wave form of one cycle, and two screw segments 23 each being formed on an upper end of each spring portion 22. Each spring portion 22 is formed integrally with the screw segment 23 to connect the screw segment 23 to the base portion 21. On an inner wall of each screw segment 23, an internal thread 25 is formed so as to be engaged with a thread formed on the shaft section of the bolt member 9, and two screw segments 23, 23 are disposed spacing therebetween and facing with each other in a diametrical direction to form one screw as a whole and to form a bolt insert hole in a center thereof. Number of the screw segments 23 shall be at least two. The number of the screw segments 23 may be three or more, and in that case, each screw segment shall be provided with a spring portion. A bolt insert hole 26 is formed on a center of the base portion 21 in a position corresponding to the bolt insert hole formed by the screw segments 23.

Each of the spring portions 22 biases or pushes each of the screw segments 23 up from the base portion 21. Accordingly, when the screw segment 23 is pushed downward under non-load condition shown in FIGS. 9 and 10, the screw segment 23 is moved downward due to a deflection of the spring portion 22, and when being released from the pushing force, the screw segment 23 moves up to recover its non-load position. An upper external surface of the screw segment 23 is formed into a tapered surface 27 gradually reducing an outer diameter thereof toward top end thereof. The tapered surface 27 cooperates with the tapered surface 19 formed on the inner wall near to the flange of the housing stem 14 to change an inner diameter of the nut formed by the screw segments 23. In detail, when the screw segments 23 are pushed up by the spring portions 22, the tapered surfaces 27 of the screw segments 23 are moved upward along the tapered surface 19 of the stem inner wall and the two screw segments 23 are gradually moved inward by the tapered surface 19 to contract an inner diameter of the inner thread of nut formed by both screw segments 23. The inner diameter of the stem 14 below the tapered surface 19 is formed into a size which makes the bolt insert hole formed by both screw segments 23, 23 be slightly larger than the outer diameter of the shaft section of the bolt member 9 when the outer surfaces of the two screw segments 23, 23 of the nut body 11 are brought into contact with the inner wall of the stem 14. Thus, when the shaft section of the bolt member is pushed into the nut member 5, the screw segment 23 can be moved downward below the tapered surface 19 owing to an elasticity of the spring portion 22, and as it is moved downward, a distance between the screw segments 23 and 23 increases to extend a size of the bolt insert hole therebetween until it exceeds the outer diameter of the shaft section of the bolt member. Accordingly, the bolt can be moved downward to a fastening point without any rotational operation. When the movement of the bolt is stopped, the screw segment 23 is released from an increase of the pushing force and, in turn, is pushed upward by a recovery force of the spring portion 22 and thereby is moved inward, which makes the internal thread 25 be tightly engaged with the external thread of the bolt member 9. In addition, the bolt member 9 can be rotated under this condition to enhance the fastening as in a case of conventional nut.

A step 29 is formed on the base portion 21 to properly position the lower portion of the housing 10 thereto. Further, a pair of engagement pawls 30, 30 is formed on the upper surface of the base portion 21 facing with each other in a diametrical direction to be engaged with the housing 10.

Referring again to FIGS. 2 to 7, the nut member 5 will be described. On an inside of the housing 10 of the nut member 5, there is provided a pair of guides 31 is provided extending downward from the flange 13 each facing with each other in a diametrical direction. Each of the guides 31 is formed in a position to be disposed between two screw segments 23 and 23 of the nut body 11, and a length thereof is extended so as to work as a stopper when the nut body 11 is inserted into the housing 10, that is, the guide 31 reaches near to the base portion 21 of the nut body in an assembled condition thereof. The guide 31 fills a space between two screw segments 23 and 23 of the nut body 11 and functions to guide and control the bolt so that an axial center line of the bolt member 9 to be inserted into the bolt insert hole formed around a center line of the two screw segments 23 and 23 may be aligned with the center line of the bolt insert hole, and thereby, the internal thread 25 of the screw segment 23 is surely engaged with the external thread of the bolt member. Since each of the guides 31 is disposed in a space between two screw segments 23 and 23, the inner diameter of the screw segments 23 can be prevented from being excessively contracted when the inner diameter of the screw segments 23 is contracted by a cooperation of the tapered surfaces 27 and 19, that is, the bolt insert hole formed by both screw segments 23 and 23 can be prevented from being contracted to be too small to insert the shaft section of the bolt member thereinto. Further, since the guide 31 is disposed adjacent to the screw segment 23, the nut body 11 can be prevented from being rotated freely with respect to the housing 10. Since each of the guides 31 is extended near to the base portion 21 of the nut body 11 so as to work as a stopper when the housing 10 is joined with the nut body 11, the base portion 21 of the nut body 11 can be properly engaged with a lower end of the housing 10.

A pair of engagement steps 33 is formed in an inner lower end portion of the stem 14 of the housing 10 so as to be engaged with the pair of engagement pawls 30 formed on the base portion 21 of the nut body 11. In this embodiment, the engagement step 33 is formed by the use of the guide 31. A molding hole 34 (see FIG. 2) is formed vertically through a central portion of the guide 31, and the engagement steps 33 are formed on the lower end portion of the stem 14. Since the engagement step 33 is formed adjacent to the guide 31 as described above, the engagement pawl 30 can be rigidly engaged with the engagement step 33 when the housing 10 is jointed with the nut body 11 and each of the engagement pawls 30 is engaged with corresponding each engagement step 33 with the lower end surface of the guide 31 being brought into contact with the base portion 21. FIG. 11 shows a condition where the nut body 11 is inserted into the hollow portion of housing 10 to be joined therewith. This joining operation is performed only by pressing the nut body 11 into the hollow portion of the housing 10 with the guides 31 of the housing 10 being disposed in the spaces between the screw segments 22, and thereby the engagement pawls 30 of the nut body 11 are engaged with the engagement steps 33 of the housing 10 to maintain a joined condition. The nut member 5 is made up completely by this joining operation.

Figure 12:
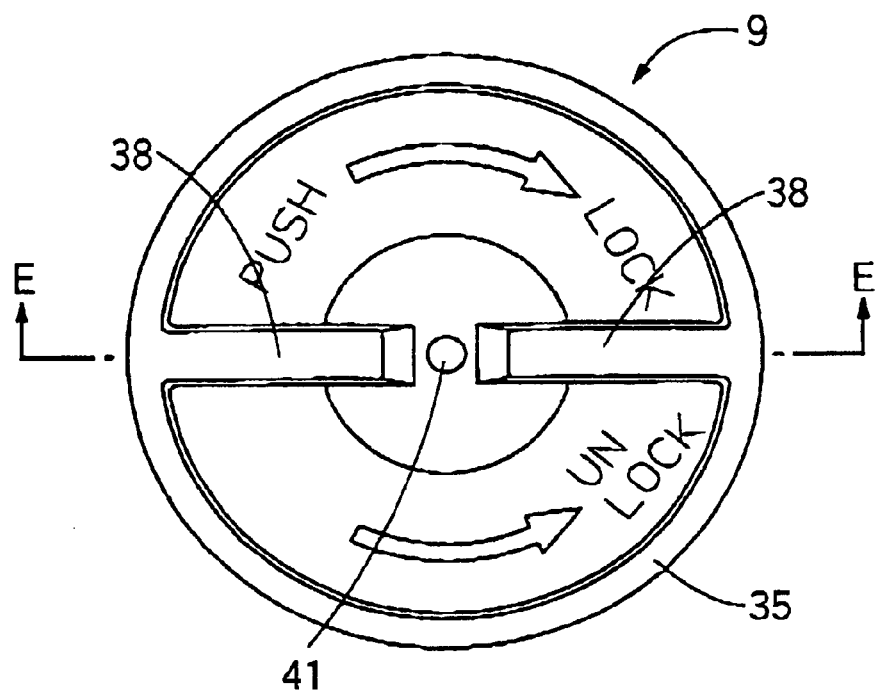
FIG. 12 is a plan view of the bolt member, which is one of the main elements of the spare-tire fastening structure of the present invention.
Figure 13:
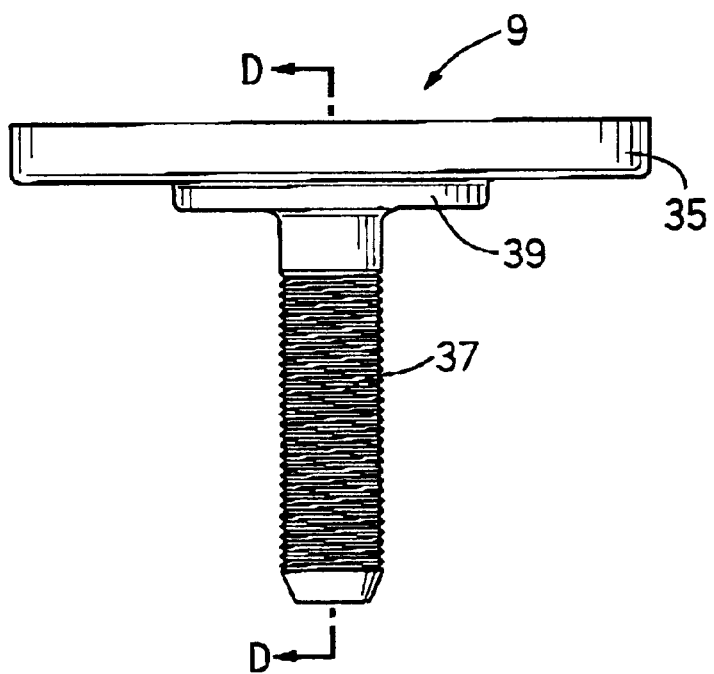
FIG. 13 is a front view of the bolt member of FIG. 12.
Figure 14:
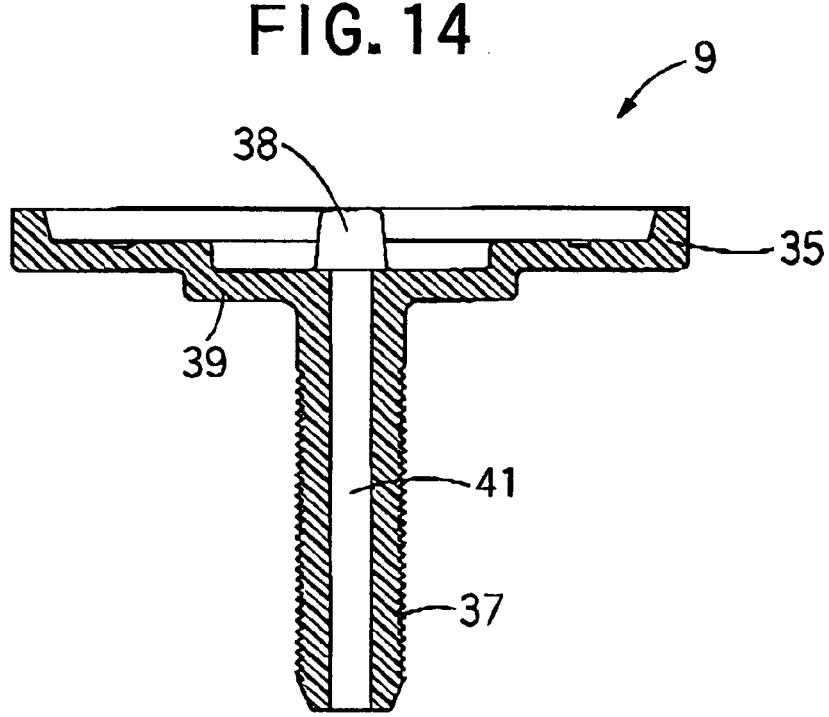
FIG. 14 is a cross sectional view of the bolt member taken on line D—D of FIG. 13.
Figure 15:
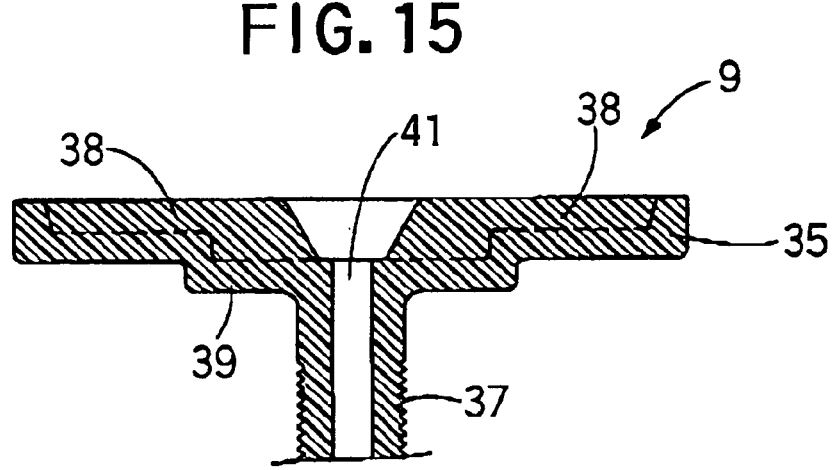
FIG. 15 is a partial sectional view of the bolt member taken on line E—E of FIG. 12.

Then the bolt member 9 is described in detail with reference to FIGS. 12 to 15. In the present embodiment, the bolt member 9 is made of plastics as one unit. The bolt member 9 is composed of a head section 35 formed into a large disc having a diameter enough to hold the wheel 6 of the spare-tire 1 and a shaft section 37 extending downward from the head section 35 and formed to have the external thread mating with the internal thread formed by the nut body 11. Though the head section 35 is formed into a disc in the illustrated example, it may be formed into rectangular. A knob 38 is provided on an upper surface of the head section 35 so as to be handled by finger. Since the knob 38 is formed as a rib extending along a diametrical direction as shown in FIG. 12, the bolt member 9 can be easily rotated around a center axis of the shaft section 37 without any tool by handling the knob by finger. By a normal rotating operation, the fastening of the bolt member 9 to the nut member 5 can be enhanced, and by a reverse rotating operation, the bolt member 9 can be disengaged from the nut member 5. As shown in FIG. 12, information about fastening and disengaging operation thereof to the nut member 5 may be indicated on an upper surface of the head section 35. A circular step 39 is provided on an under surface of the head section 35 projecting downward therefrom including a base portion of the shaft section 37. The circular step 39 is formed to be received into (preferably fitted to) the mounting hole 7 of the spare-tire wheel 6 to prevent a rattling of the spare-tire after having been mounted. A drain hole 41 is formed in a center of the shaft section 37 so that the water or the like on the head section 35 may be drained.

A mounting operation of the spare-tire 1 onto the bracket 2 or the support member in the spare-tire receiving section by the nut member 5 and the bolt member 9, which make up the spare-tire fastening structure, will be described with reference to FIGS. 16 to 18. Referring to FIG. 16, the spare-tire support member or the bracket 2 is fixed to a vehicle body 42 in the spare-tire receiving section. The mounting hole 3 is formed on the bracket 2 (as to the mounting hole 3, see also FIG. 1). The nut member 5 assembled as shown in FIG. 11 is pressed into the mounting hole 3 by inserting the housing stem 14 from upper side of the bracket as shown by an arrow 43. By this pressing operation, as shown in FIG. 17, the housing flange 13 is brought into surface-contact with the upper surface of the bracket 2, the engagement pawl 17 of the housing stem 14 is engaged with the under surface of the bracket 2, and thereby the nut member 5 is anchored to the bracket 2.

After the nut member 5 having been anchored to the bracket 2, the spare-tire 1 is placed on the vehicle body 42 of the spare-tire receiving section (or the bracket 2) with the mounting hole 7 of the spare-tire wheel 6 being aligned with the nut member 5. Under this condition, as shown in FIG. 17 by an arrow 45, the bolt member 9 is pressed in the same direction as of the pressing operation for mounting the nut member 5, that is, the direction shown by the arrow 43 of FIG. 16, and thereby the shaft section 37 of the bolt member 9 is inserted through the mounting hole 7 into the bolt insert hole 29 of the nut member 5. This inserting operation applies a pressing force downward to the upper portions of the screw segments 23 of the nut body. The screw segment 23 is moved downward against the elastic force of the spring portion 22 along the tapered surface 19 of the housing, and as it is moved downward, a distance between the screw segments 23 and 23 increases to extend a size of the bolt insert hole therebetween until it exceeds the outer diameter of the external thread of the shaft section 37 of the bolt member 9, so that the bolt member 9 can be further pressed downward under this condition.

Figure 21:
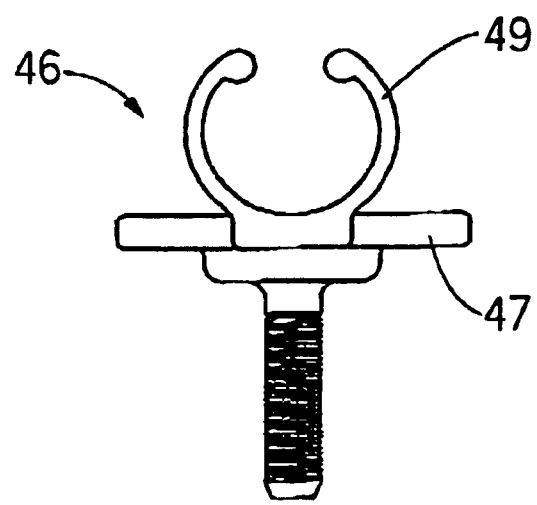
FIG. 21 is a side view of the bolt member of FIG. 19.
Figure 22:
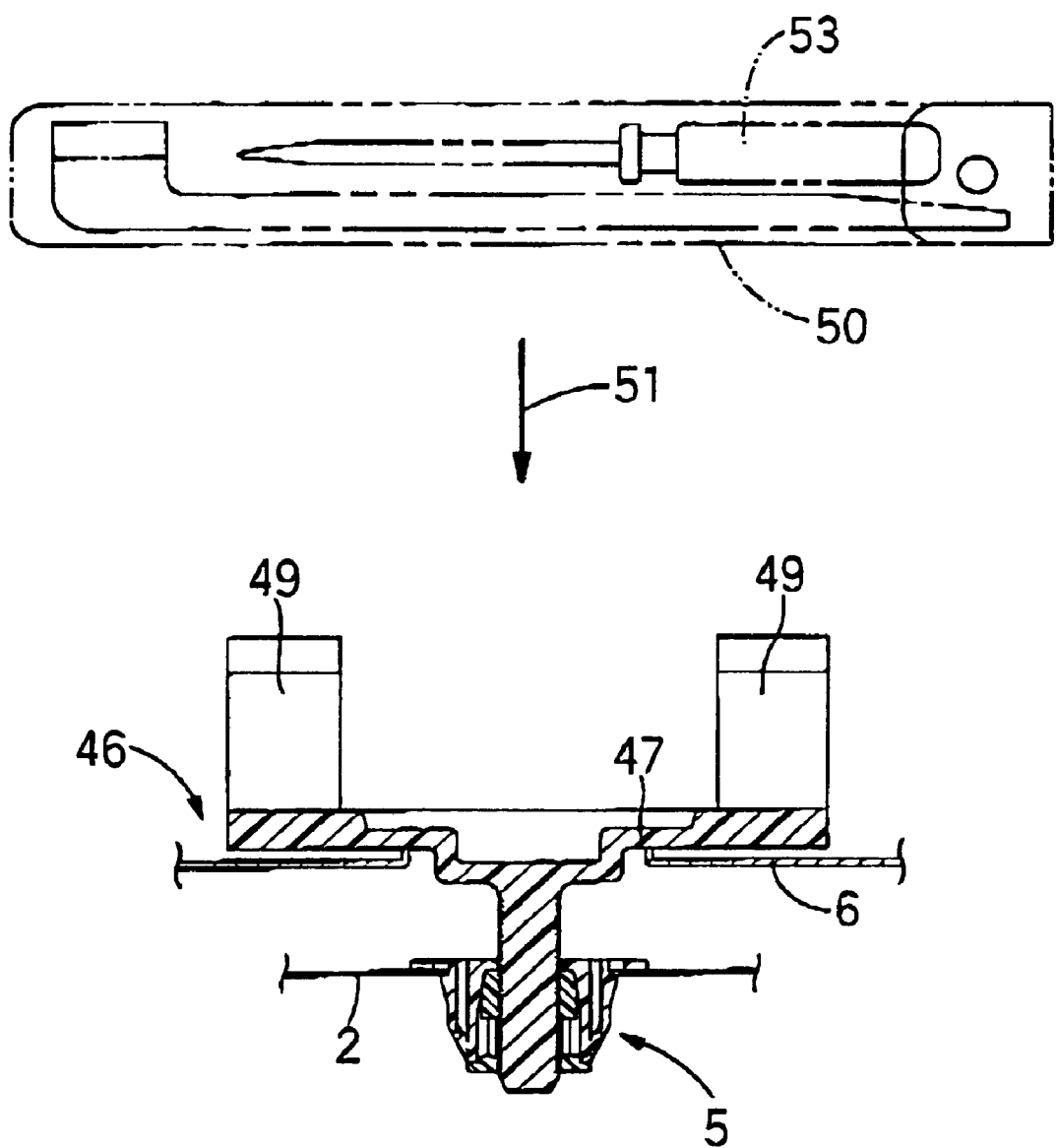
FIG. 22 shows how to mount a service tool case to the bolt member.

Referring to FIG. 18, when the head section 35 of the bolt member 9 comes in contact with the wheel 6, the shaft section 37 of the bolt member 9 does not apply the pressing force more to the screw segments 23, and the spring portions 22 apply an upward force to the screw segments 23. The screw segments 23 are moved upward by this recovery force and two screw segments 23 are moved inward by the cooperation of the tapered surface 19 on the inner surface of the housing stem and the tapered surface 27 of the screw segments, and thereby the internal thread 25 of the screw segments is tightly engaged with the external thread of the shaft section 37 of the bolt member, that is, the bolt member 9 is fastened to the nut member 5. When, under this fastened condition, the shaft section 37 is rotated around the center axis thereof by handling the knob 38 on the head section 35 of the bolt member 9, the fastening thereof is enhanced to rigidly hold the spare-tire 1 between the head section 35 of the bolt member 9 and the bracket 2 to which the nut member 5 is anchored. When the spare-tire 1 is to be disengaged, the shaft section 37 shall be rotated around the center axis thereof by handling the knob 38 on the head section 35 of the bolt member 9. Thus, the tight fastening and the disengaging operations can be performed easily by the knob 38 without any tool. FIGS. 19 to 22 show an alternative embodiment of the bolt member. In this alternative embodiment, a bolt member 46 is equipped with a pair of tool holders 49 formed on a head section 47 thereof. In the illustrated example, each of the holders 49 is composed of a pair of flexible curved arms opening upward as shown in FIG. 21. Thus, when a cylindrical tool case 50 is pressed into the holder 49 along an arrow 51 as shown in FIG. 22, the tool case 50 can be held by the holder 49 without any additional operation. The tool case 50 receives some service tools including a screw driver or the like. The holder may be of any shapes, and may be configured to directly hold the tool.

What is claimed is:

1. A spare-tire fastening structure for fastening a spare-tire to a support member in a spare-tire receiving section comprising a bolt member and a nut member, said nut member being anchored to the support member;

said nut member comprising a plastic housing including a flange and a hollow stem extending from said flange; and a plastic nut body including a base portion, at least two screw segments with each having an internal thread formed on an inner surface thereof, so as to form one screw as a whole, and further including spring portions extending from each of said screw segments to said base portion to bias or push each of said screw segments up from said base portion;

an outer surface of said housing stem of said nut member being formed with engagement pawls which are associated with said flange to grip said support member between said pawls and said flange; and said nut member being adapted to be mounted on said support member by inserting said housing stem from an end thereof opposite to said flange into a mounting hole of said support member and pressing said housing stem thereinto until said flange is brought into surface-contact with said support member;

said bolt member being adapted to be pressed through said spare-tire wheel into said nut member in the same direction as of a pressing operation for mounting said nut member, so that said bolt member is engaged with said nut member to fasten the spare-tire to the support member.

2. A spare-tire fastening structure in accordance with claim 1, in which said housing stem is formed to have a non-circular cross-section fitting to a non-circular mounting hole of said support member so that said housing does not rotate with respect to said support member after having been mounted thereon.

3. A spare-tire fastening structure in accordance with claim 1, in which said bolt member is made of integrated plastic molding having an elongated shaft section with an external thread formed thereon and a head section of large diameter formed on an end of said shaft section.

4. A spare-tire fastening structure in accordance with claim 3, in which said head section of said bolt member is provided with a knob formed on an upper surface thereof for handling it by finger.

5. A spare-tire fastening structure in accordance with claim 3 or 4, in which said bolt member has a tool holder formed on an upper surface of said head section thereof.

* * * * *